(12) United States Patent
Axmann et al.

(10) Patent No.: US 6,412,623 B2
(45) Date of Patent: *Jul. 2, 2002

(54) ROLLER CONVEYOR

(75) Inventors: Norbert Axmann, Sinsheim-Ho.; Manfred Fessenbecker, Sinsheim-Rohrbach, both of (DE)

(73) Assignee: Axmann Fördertechnik GmbH, Sinsheim-Steinfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,146

(22) Filed: Sep. 7, 1999

(30) Foreign Application Priority Data

Sep. 11, 1998 (DE) ......................... 198 41 608

(51) Int. Cl.⁷ ............................... B65G 13/06
(52) U.S. Cl. ...................... 198/791; 198/790
(58) Field of Search ................. 198/781.07, 781.09, 198/781.1, 789, 790, 791, 782

(56) References Cited

U.S. PATENT DOCUMENTS

| | | | |
|---|---|---|---|
| 3,598,225 A | 8/1971 | Merrick | |
| 4,131,420 A | * 12/1978 | Miller | 198/791 X |
| 4,752,000 A | * 6/1988 | Hodgin | 198/790 X |
| 4,921,091 A | 5/1990 | Kehlenbach | 198/782 |
| 5,392,899 A | * 2/1995 | Wakabayashi | 198/790 X |
| 5,485,911 A | * 1/1996 | Kettelson et al. | 198/791 |

FOREIGN PATENT DOCUMENTS

| | | | |
|---|---|---|---|
| DE | 1 269 982 | 6/1968 | |
| DE | 2 037 627 | 2/1972 | |
| DE | 25 24 516 | 12/1976 | |
| DE | 32 15 921 | 11/1983 | |
| DE | 34 16 563 | 11/1984 | |
| DE | 42 11 874 | 10/1993 | |
| DE | 43 33 518 | 4/1995 | |
| DE | 195 47 893 | 6/1997 | |
| GB | 461 933 | 2/1937 | |
| GB | 1 046 453 | 10/1961 | |
| GB | 1 573 564 | 2/1976 | |
| GB | 1 534 643 | 12/1978 | |
| GB | 2219781 | * 12/1989 | 198/781.1 |

\* cited by examiner

*Primary Examiner*—James R. Bidwell
(74) *Attorney, Agent, or Firm*—Collard & Roe, P.C.

(57) ABSTRACT

A roller conveyor having side wings spaced apart from each other for accommodating rollers that are arranged between these side wings successively in the direction of conveyance. These rollers are rotatably supported at both ends by trunnions extending into these rollers on their face sides, and are driven by a motor. In addition, at least one roller is in driving connection via a gearing with a driving motor arranged on a side wing on the driving side. In this case, the driving motor may be designed in the form of a bow-like section which is open on the side facing away from the rollers. In this case, the driving motor and the gearing, may be combined in a geared motor, and are accommodated within the box-like section.

8 Claims, 3 Drawing Sheets

ROLLER CONVEYOR

BACKGROUND OF THE INVENTION

1. Field of the Invention

The invention relates to a roller conveyor with side wings extending out and spaced apart from each other wherein a series rollers are successively arranged between these side wings in the direction of conveyance. The rollers are rotatably supported on both sides at both ends by means of trunnions extending into the rollers on their face sides. These rollers are driven by a motor.

2. Description of the Prior Art

Generally, roller conveyors are equipped with drum drives. Drum drives are arranged within the tubular rollers of the conveyor, transmitting the driving motion to the respective roller by means of a non positive friction drive. These drum drives consist of a DC motor and a gearing. When the rollers are driven, the counter-torque is introduced into, and absorbed in one of the side wings of the conveyor via a square or hexagonal shaft. This shaft is hollow and allows a cable to extend through the hollow shaft from the outside and into the interior of the motor.

The advantage offered by such drum drives lies in that they are accommodated within the driven rollers in a space saving way. However, only motors with low capacities can be installed because of the limited diameter of the rollers having a clear inner width, for example, a width of only 50 mm. Furthermore, it is unfavorable to have only motors designed for 24 volts DC, that can be employed in most cases for safety reasons.

SUMMARY OF THE INVENTION

The object of the invention is to provide an improved roller conveyor wherein the drives can be installed without limitations of the diameter of the rollers and driving motors of any desired type and with any desired operating voltage.

This problem is solved wherein the roller conveyor is in driving connection via a transmission with a driving motor arranged on a side wing outside of the actual roller conveyor.

As opposed to the prior art, in the present invention, the driving motor is arranged outside of the driven roller on the side wing located on the driving side. This eliminates the limitation of the structural size of the driving motor posed in the prior art by the diameter of the rollers, and the limitation of the motor capacity conditioned by the former limitation. It is now possible by virtue of the invention to install driving motors of any desired type and size on the outer side of the side wing and to transmit their driving output via an interconnected gearing or transmission to the roller to be driven.

According to a further development of the invention, the side wing on the driving side is designed as a box section which is open on the side facing away from the rollers, wherein the driving motor and the gearing are received within the box like section so that they do not project laterally from the roller conveyor.

The open side of the side wing designed in the form of a box-like section is usefully closed by an external cover, and the driving motor and the gearing are accordingly accommodated in this further developed embodiment in a space, encapsulated against the outside.

A particularly compact type of design is obtained if, according to another further development of the invention, the driving motor and the gearing are combined in a geared motor. This motor is suitably mounted on the side of the lateral wing of the roller conveyor facing away from the rollers.

According to another development of the invention, the trunnion supporting the roller on the driving side may be an output shaft of the gearing protruding into the roller at the face end. These shafts are connected with torsional strength with the roller and extend through a recess in a side wing.

Therefore, in a further developed embodiment, the output shaft of the gearing assumes the support of the driven roller on the driving side. In this case, conventional roller conveyors require a special bearing arranged, on the side of the lateral wing on the driving side pointing at the roller.

According to another important embodiment of the invention, the driving connection between the gearing and the motor-driven roller comprises a coupling compensating an angular or axial error.

This type coupling contains a sleeve of the coupling wherein it has torsional and axial strength in the roller at the face end on the driving side. It is also provided with an inner toothing as well as a hub component. This hub component is connected with torsional and axial strength with the trunnion on the driving side. For example, the output shaft of the gearing has an outer toothing positively engaging the inner toothing of the sleeve of the coupling.

This type coupling permits replacement of the driven roller, when needed, so that it doesn't require dismantling and reinstallation of the transmission gearing or driving motor. This coupling provides for a particularly precise support of the roller on the driving side if the hub component of the coupling is received on the output shaft projecting from the gearing.

The outer sleeve of the coupling may be connected with the driven roller with torsional and axial strength in any desired way. However, it was found that it is particularly simple and inexpensive if the sleeve of the coupling is pressed into the tubular roller at the face end.

To compensate against any alignment flaws between the trunnion of the driving side and rotational axle of the driven roller, the outer toothing of the coupling's hub component is preferably cambered or spherical.

Furthermore, the axial expanse of the hub component should be smaller than the axial expanse of the sleeve of the coupling so that a certain compensation of axial errors is possible within preset limits.

With the roller conveyor, the rollers not directly driven by the motor are in driving connection with the roller directly driven by the motor via loop drives. To drive via these loops, each of these rollers has two circumferential corrugations which are spaced apart from each other axially for accommodating round or toothed belts or similar known driving means producing a rotational connection in each case with the adjacent roller. This rotational connection is located on the side facing away from the drive.

The invention provides a roller conveyor in which commercially known motors and transmissions and particularly geared motors can be employed, so that there can be nearly unrestricted variations in speed (rpm's) and torque. Since the drive is arranged outside of the actual roller conveyor track, the conveyor can be used in sterilized or wet rooms. Furthermore, arranging the drive off-side the actual roller conveyor track permits a high safety standard. This is because the motor and transmission gearing is encapsulated and there is protected installation of the electric feed connections.

The driven shaft transmits torque to the driven roller via a compensating coupling which allows the roller to swing in all directions. This is in addition to the positive transmission of the force within preset limits. In this case, the installation errors or flaws are directly compensated. Furthermore, the use of such a coupling permits simple dismantling and reinstallation of the driven roller without having to remove the driving motor and the gearing for such a purpose.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

DETAILED DESCRIPTION OF THE PREFERRED EMBODIMENT

Figure 1:
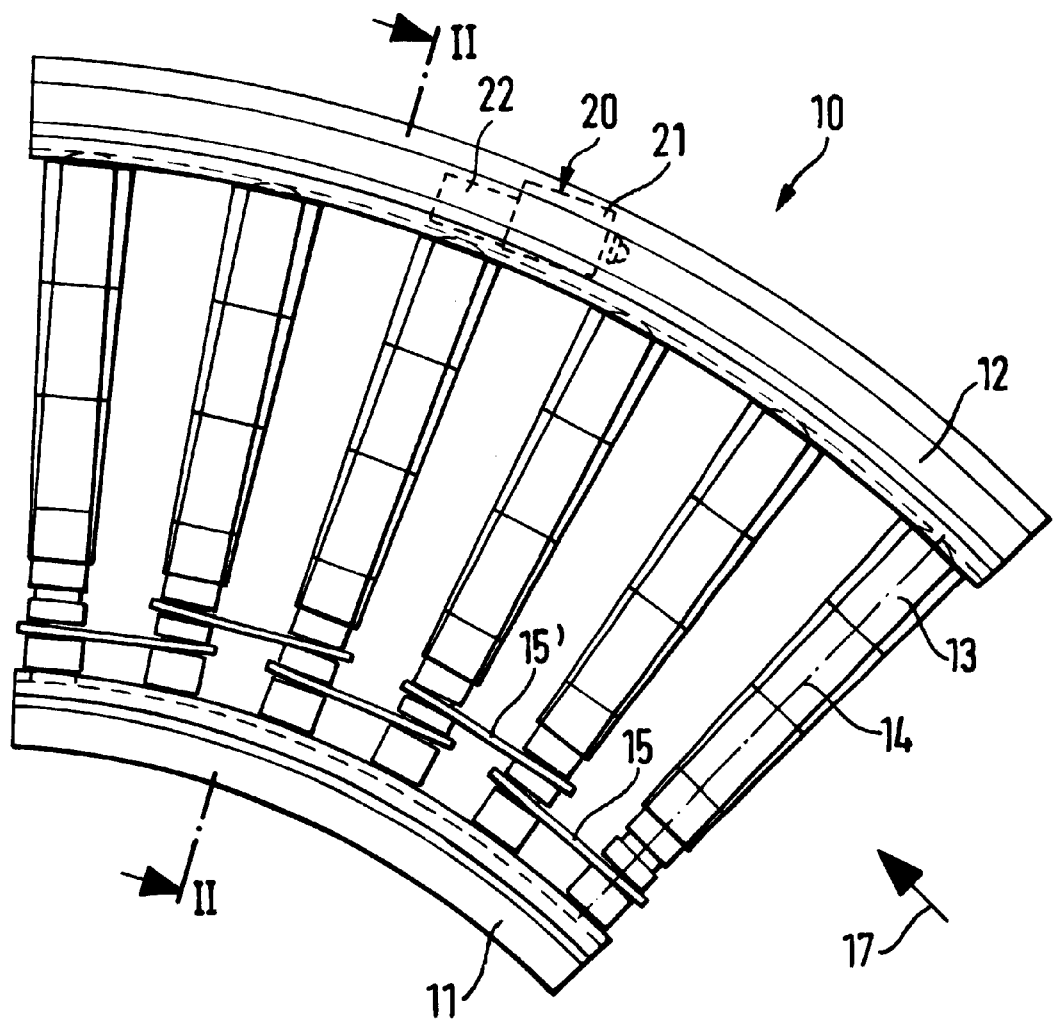
FIG. 1 is a top view of a roller conveyor designed as an angular or curved conveyor.
Figure 2:
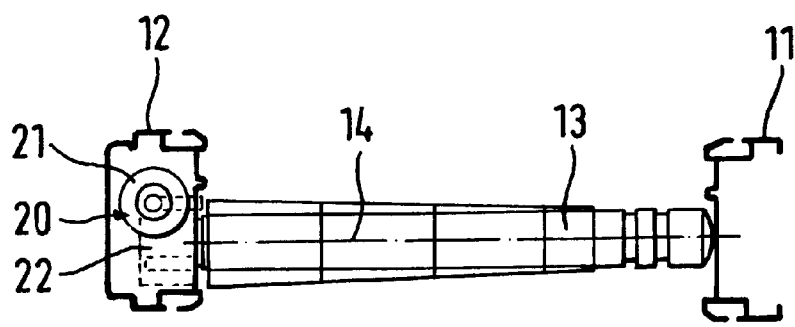
FIG. 2 is a cross section according to section line II—II in FIG. 1 through the roller conveyor, showing the drive of a roller by means of a geared motor mounted on a side wing.

The roller conveyor 10 shown in FIG. 1 by a top view is an angular or curved conveyor having an inner side wing 11 and an outer side wing 12. This also comprises conical or tubular rollers 13, which are rotatably supported between these side wings and are spaced apart from one another in the longitudinal direction of the roller conveyor. Rollers 13 are arranged so that their axes of rotation 14 intersect each other in the center, disposed beyond the inner side wing 11. Rollers 13 are each in a driving connection with each other via a loop drive 15, 15' arranged within the proximity of inner side wing 11. These loop drives are round belt drives each having a round belt guided in a corrugation 16 and 16' impressed with an axial spacing from one face end of the roller. Arrow 17 indicates the direction of conveyance of roller conveyor 10.

Figure 3:
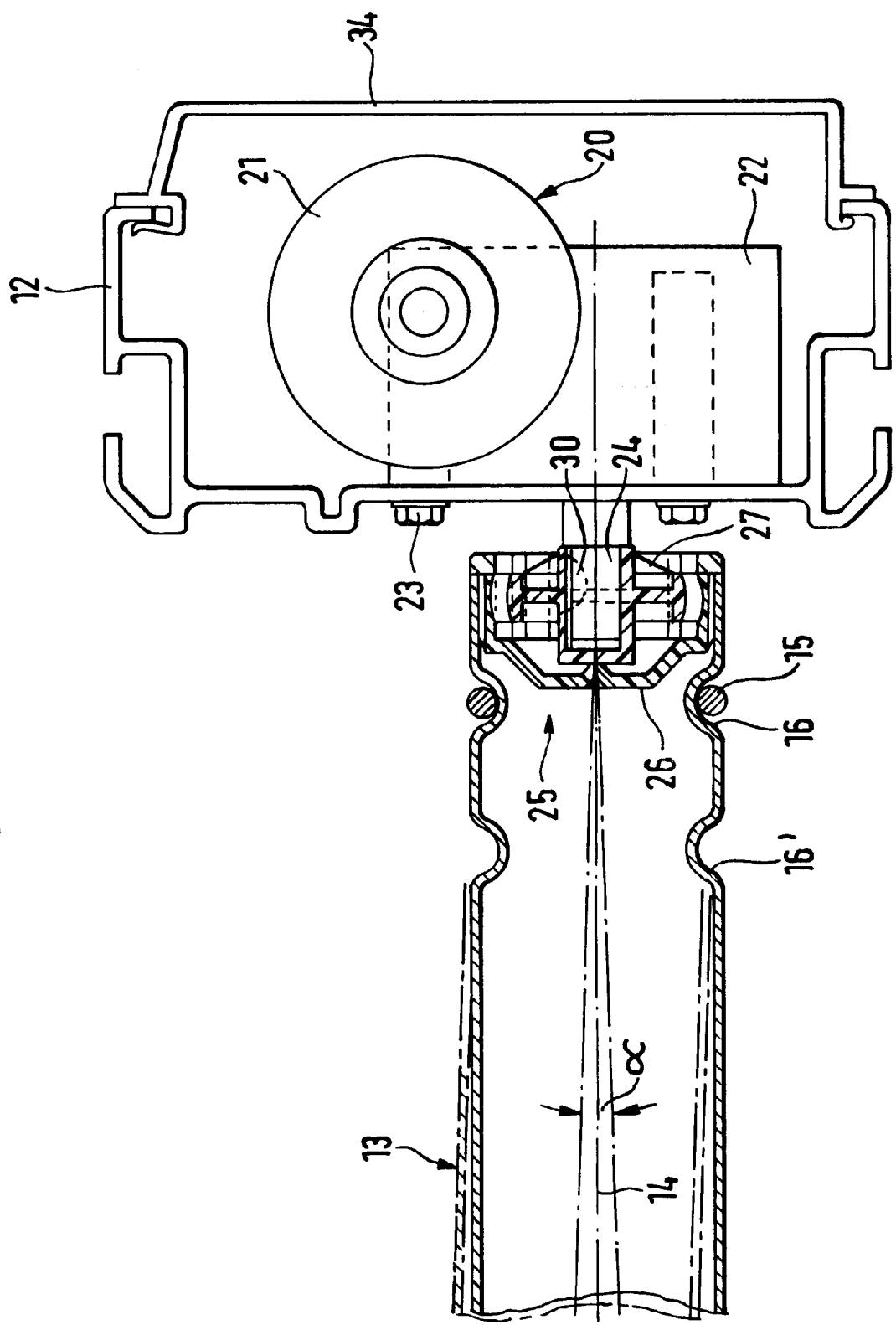
FIG. 3 shows a mirror image representation of FIG. 2 wherein there is an enlarged cutout of the roller drive.

A geared motor 20 consists of a drive motor 21 and a gearing 22. Geared motor 20 connects to one of the rollers 13, as a direct drive. FIG. 3 shows the geared motor 20 secured by means of screws 23 on the side of the outer side wing 12 facing away from the driven roller 13. Geared motor 20 is arranged so that a driven shaft 24 of gearing 22 extends through side wing 12 and projects at the face end into the driven roller 13. The driving connection between the driven shaft 24 of the gearing and the driven roller 13 is established by a coupling 25 which is received on the side pointing at the gearing 21 in roller 13 at the face end.

Figure 4:
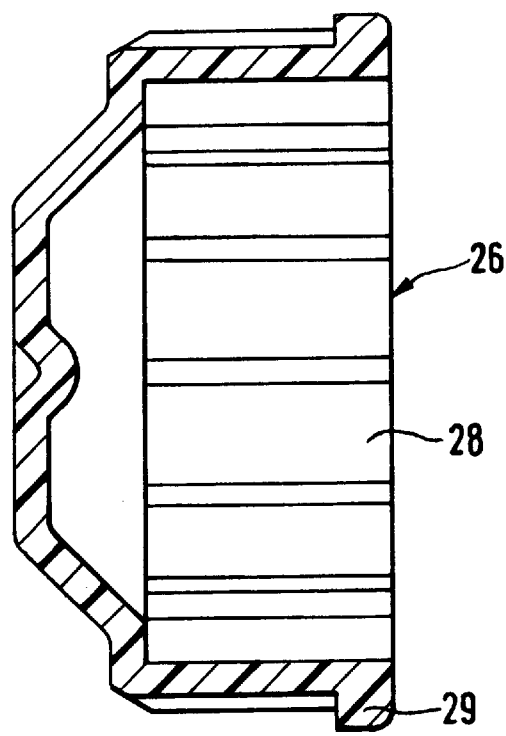
FIG. 4 is an outer sleeve of the coupling, wherein this sleeve is provided with an inner toothing.
Figure 5:
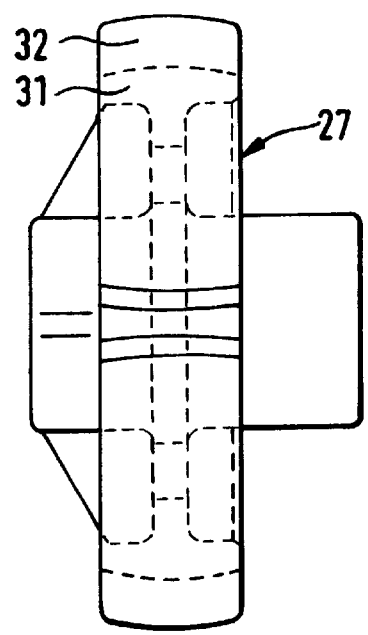
FIG. 5 is a hub component of the coupling equipped with a cambered or spherical outer toothing.

Coupling 25 comprises an outer coupling sleeve 26 and an inner hub component 27, these two parts being separately shown in FIGS. 4 and respectively 5. The sleeve of the coupling and hub component are molded plastic parts.

Coupling sleeve 26 is designed in the form of a pot, and has an inner toothing 28 and a circumferential edge flange 29 at the open-sided end. Coupling sleeve 26 is pressed into driven roller 13 from the face end of the latter pointing at gearing 22, in a way so that it is mounted there with torsional and axial strength. This circumferential edge flange 29 is seated on the face end of roller 13 pointing at gearing 22.

Hub component 27 has a corresponding inner toothing 28 in a hub segment so that it can be received on a driven shaft 24 of gearing 22. Shaft 24 extends through the outer side wing 12 and projects into the face end of roller 13. Shaft 24 is connected with torsional and axial strength with the driven shaft. For example, the torsionally rigid connection can be established by a driving spring 30, which is inserted in longitudinal grooves suitably cut into driven shaft 24 and the recess in the hub segment. A cambered or spherically shaped outer toothing 32 protrudes radially from the hub segment of hub component 27 extending concentrically relative to the latter.

Coupling sleeve 26, is pressed into driven roller 13 at the face end. In this way, hub component 27 is received so that the spherically designed outer toothing 32 of the driving segment 31 engages the inner toothing 28 of coupling sleeve 26. The spherical design of outer toothing 32 of hub component 27 permits compensating alignment flaws between driven shaft 24 of the gearing and rotational axis 14 of the driven roller 13 without any problems. In FIG. 3 an alignment error between driven shaft 24 of gearing 21 and the rotational axis 14 of roller 13 is indicated as an angle. The axial expanse of hub component 27 is smaller than the depth of coupling sleeve 26 so that in addition to compensating alignment flaws, axial errors can be compensated within preset limits. In this case, the driving segment 31 has spherically designed outer toothing 32. This segment extends concentrically around hub segment 29, and is received within the inner toothing of coupling sleeve 26 with axial play.

The outer side wing 12 of roller conveyor 10 is designed in the form of an open box-like section, wherein this section is open on the side facing away from rollers 13.

On the outer side, the box-like section is closed by means of an easily removable cover 34 wherein the geared motor 20 is accommodated so that there is a space which is encapsulated against the outside. The electrical feed cables for driving motor 21 of geared motor 20 are also installed in a covered position within the encapsulated space.

Accordingly, while several embodiments of the present invention have been shown and described, it is to be understood that many changes and modifications may be made thereunto without departing from the spirit and scope of the invention as defined in the appended claims.

What is claimed is:

1. A roller conveyor comprising:
   a) a plurality of side wings spaced apart from each other;
   b) a plurality of rollers successively arranged between said plurality of side wings in the direction of conveyance wherein at least one of said plurality of rollers is a driven roller;
   c) at least one motor disposed on one of said plurality of side wings outside the roller conveyor and connected to said at least one driven roller;
   d) at least one gearing connecting said at least one motor to said at least one driven roller;
   e) a plurality of trunnions extending within said plurality of rollers on their face sides, said plurality of trunnions supporting said plurality of rollers within said plurality of side wings wherein at least one trunnion is designed as an output shaft of said gearing and supports said at least one driven roller by projecting into said driven roller at a face end and connects with torsional strength with said at least one driven roller; and
   f) at least one coupling serving as a driving connection between said at least one gearing and said at least one driven roller wherein said coupling compensates for both angular and axial errors of said plurality of rollers.

2. The roller conveyor according to claim 1, wherein said coupling consists of a coupling sleeve having torsional and axial strength in said at least one driven roller at a face side and on a driven side.

3. The roller conveyor according to claim 2, wherein said coupling sleeve is pressed into said face end of said plurality of rollers.

4. The roller conveyor according to claim 1, wherein said plurality of rollers not directly driven by said at least one motor are coupled to said driven roller via a plurality of loop drives.

5. The roller conveyor according to claim 4, wherein said plurality of rollers each comprise two circumferential corrugations extending axially spaced from one another with said face end, so that said plurality of loop drives formed as round belts, or toothed belts establish a rotational connection with each adjacent roller.

6. The roller conveyor as in claim 1, further comprising an external cover disposed on said plurality of side wings so that said at least one driving motor and said at least one gearing are enclosed within said cover.

7. The roller conveyor as in claim 1, wherein said at least one driving motor and said at least one gearing are combined in a compactly built geared motor.

8. The roller conveyor in claims 1, wherein said plurality of side wings are shaped as a box like section, and are disposed on a side facing away from said plurality of rollers so that said at least one driving motor and said at least one gearing are disposed in said box like section.

* * * * *